United States Patent
Shaffer (12)

(10) Patent No.: US 6,275,333 B1
(45) Date of Patent: Aug. 14, 2001

(54) DISPLAY WINDOW MAGNIFICATION DEVICE

(76) Inventor: Wendy E Shaffer, 45125 Spanish Spur Trail, Aguanga, CA (US) 92536

( * ) Notice: Subject to any disclaimer, the term of this patent is extended or adjusted under 35 U.S.C. 154(b) by 0 days.

(21) Appl. No.: 09/490,620

(22) Filed: Jan. 25, 2000

(51) Int. Cl.[7] ................................................... G02B 27/02
(52) U.S. Cl. .......................... 359/440; 359/802; 359/809
(58) Field of Search ..................................... 359/802, 811, 359/440, 803, 809, 819; 379/433, 440, 441, 449, 450

(56) References Cited

U.S. PATENT DOCUMENTS

| | | |
|---|---|---|
| 4,451,117 | 5/1984 | Goode . |
| 5,075,799 | 12/1991 | Pine et al. . |
| 5,608,203 | 3/1997 | Finkelstein et al. . |
| 5,706,255 | 1/1998 | McKay . |
| 6,151,172 | * 11/2000 | Ferraro ................................. 359/802 |

* cited by examiner

Primary Examiner—James Phan
(74) Attorney, Agent, or Firm—Michael I. Kroll (57) ABSTRACT

The present invention 10 discloses a magnification device for being removably mounted onto the display window 14 of a cell phone 12 or the like. The device discloses a housing member 20 having a plurality of removable magnifying lenses 16 contained therein. The lenses 16 may be removable by being stacked onto each other or mounted in slots 24 disposed in the housing 20. A strap 22 is provided having mating hook and loop material 34 on its ends for attachment about a cell phone 12 or the like. An additional external hook and loop member 36 is provided to allow attachment of the strap 22 and cell phone 12 to a proximate object 40. A removable clip 44 may also be provided for attachment of the strap 22 and cell phone 12 to an article of clothing.

13 Claims, 12 Drawing Sheets

LENS COMBINATION/CONVERSION CHART

| MAGNIFICATION | LENS 1 | LENS 2 | LENS 3 | LENS 4 |
|---|---|---|---|---|
| 125X | ○ | | | |
| 156X | ○ | ○ | | |
| 195X | ○ | ○ | ○ | |
| 244X | ○ | ○ | ○ | ○ |

* EACH LENS = 125X

DISPLAY WINDOW MAGNIFICATION DEVICE

BACKGROUND OF THE INVENTION

1. Field of the Invention

The present invention relates generally to magnification lenses and, more specifically, to a magnification device which can be mounted onto display windows such as cellular phones, calculators, paging devices, etc., whereby the contents of the display window will be magnified.

The magnifying device is comprised of a housing member having a plurality of lenses contained therein which are removable. This may occur as having the lenses elements peelably removable as in the case of stacked lenses or relocatable as in the case of slots within the housing whereby the distance between the lenses can be altered by moving one lens to a greater or lesser distance relative to the other.

The purpose of both the peelable stacked lenses and the relocatable lenses is to be able to vary the magnification of the contents of the display window.

To magnify objects it is necessary to place a lens some distance from the object to be magnified whereby light rays are bent so that the object appears larger, which has been the scope of the prior art devices which are able to magnify the display to a minor extent. The reason that the magnification is to a minor extent is due to the limitation imposed by a single lens and the distance the lens can be placed from the display window.

The present invention uses two or more lenses whereby the first lens is placed over the display window and one or more lenses are strategically positioned over one another until the desired magnification has been achieved. Placing a 2× lens over the window with another 2× lens placed within the top exterior planar surface of the magnification housing device will result in a 4× display. By adding another 2× lens in between the first two lenses will result in an 8× display. The magnification limits of the display is a direct variable of the number of lenses used.

2. Description of the Prior Art

There are other magnifying devices designed for display enlargement. Typical of these is U.S. Pat. No. 4,451,117 issued to Goode on May 29, 1984.

Another patent was issued to Pine et al. on Dec. 24, 1991 as U.S. Pat. No. 5,075,799. Yet another U.S. Pat. No. 5,608,203 was issued to Finklestein et al. on Mar. 4, 1997 and still yet another was issued on Jan. 6, 1998 to McKay as U.S. Pat. No. 5,706,255.

U.S. Pat. No. 4,451,117

Inventor: Robert C. Goode

Issued: May 29, 1984

Disclosed is a magnifying element for use with a digital watch face to magnify the numerals and hence facilitate the reading of the time thereby. The magnifying element has a face side and an adhesive coated side which is covered by tear strip whose removal exposes the adhesive side. Appropriate manipulative pressure applied to the face side of the magnifying element results in the adhesive coated side being attached to the digital watch face.

U.S. Pat. No. 5,075,799

Inventor: Jerrold S. Pine

Issued: 5,075,799

An apparatus is described for the magnification of an information display on a selective call receiver. The apparatus comprises an optical lens system coupled in a manner which provides for its easy attachment and removal from the selective call receiver.

U.S. Pat. No. 5,608,203

Inventor: Alan Finkelstein, et. al.

Issued: 5,608,203

A financial transaction card adapted for use in reading externally stored information includes a substantially non-foldable rigid base and a strip for carrying machine readable information. The rigid base comprises a magnifying lens.

U.S. Pat. No. 5,706,255

Inventor: Christopher B. McKay

Issued: Jan. 6, 1998

A timekeeper and magnifying device includes a watch and a magnifying lens pivotally connected to the watch. The lens may be pivoted away from the face of the watch to magnify objects. The device may include a light adjacent the magnifying lens which enables the device to be used in dark areas. Additionally, the device may contain a fastener which restricts the magnifying lens from pivoting away from the face of the watch. In the preferred embodiment of the invention, the magnifying lens may be either pivoted about the hinge or detached from the watch. In alternate embodiments of the invention, a connector removably holds the magnifying lens over the face of the watch. Furthermore, in other embodiments, the device further includes a second magnifying lens and a second hinge which cooperate with the first magnifying lens and the first hinge to form a telescope-like combination. A method for using the timekeeping and magnifying device is also disclosed.

While these magnifying devices may be suitable for the purposes for which they were designed, they would not be as suitable for the purposes of the present invention, as hereinafter described.

SUMMARY OF THE PRESENT INVENTION

The present invention discloses a magnification device for being removably mounted onto the display window of a cell phone or the like. The device discloses a housing member having a plurality of removable magnifying lenses contained therein. The lenses may be removable by being stacked onto each other or mounted in slots disposed in the housing. A strap is provided having mating hook and loop material on its ends for attachment about a cell phone or the like. An additional external hook and loop member is provided to allow attachment of the strap and cell phone to a proximate object. A removable clip may also be provided for attachment of the strap and cell phone to an article of clothing.

A primary object of the present invention is to provide a magnification device which can be mounted to display windows of electronic equipment such as cell phones, pages, calculators, watches, etc. for the purpose of optically enlarging the information displayed.

Another object of the present invention is to provide a magnification device having a housing member having means for fixedly attaching said magnification device to a display window.

Yet another object of the present invention is to provide a magnification device having a housing member having one or more magnification lenses positioned therein.

Still yet another object of the present invention is to provide a magnification device having a housing member having a plurality of stacked peelably removable lens wherein the light rays change direction at each air/lens interface until being emitted at the desired magnification.

Another object of the present invention is to provide a magnification device having a housing member having a plurality of slots whereby a plurality of lens elements can be selectively relocated until the light rays are emitted at the desired magnification.

Yet another object of the present invention is to provide a magnification device having a housing member comprised of separable housing elements each having a magnification lens contained therein, whereby a housing lens carrying element can be fixedly attached to the display window and the other housing lens carrying element can be fixedly attached to the electronic equipment exterior case, such as, a cell phone.

Still yet another object of the present invention is to provide a magnification device having a housing member, containing a plurality of lens elements, having a strap member for encompassing the electronic equipment.

Another object of the present invention is to provide a magnification device having a housing member, containing a plurality of lens elements, having a strap member for encompassing the electronic equipment.

Yet another object of the present invention is to provide a magnification device having a strap member for encompassing electronic equipment having one element of a mating fastening member exteriorly positioned whereby the second mating element can be fixedly attached to a structure, such as the dashboard of a motor vehicle, whereby the electronic equipment can be viewably selectively positioned.

Still yet another object of the present invention is to provide a magnification device which is cost effective to manufacture.

Additional objects of the present invention will appear as the description proceeds.

The present invention overcomes the shortcomings of the prior art by providing a magnification device which can be mounted onto display windows of electronic equipment such as cellular phones, calculators, paging devices, etc., whereby the contents of the display window will be magnified.

The magnifying device is comprised of a housing member having a plurality of lenses contained therein. The lens elements can be peelably removable as in the case of stacked lenses or relocatable as in the case of slots within the housing member whereby the gap between the lenses can be altered by moving one lens relative to the other.

Additionally, the present invention provides for a housing member having separable housing elements, each containing a lens element, whereby the housing elements can be spaced apart and attached to companion parts, such as one lens element attached to the display window of a cell phone and the other element attached to the cell phone carrying case.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 3 is a perspective view of the present invention. Shown is a magnification device which can be mounted onto display windows such as cellular phones, calculators, paging devices, GPS devices etc., whereby the contents of the display window will be magnified.

The magnifying device is comprised of a housing member having a plurality of lenses contained therein which are relocatable by moving within slots within the housing thereby the distance between the lenses can be altered by moving one lens to a greater or lesser distance relative to the other. Shown are three lenses whereby the first lens is placed over the display window and one or more lenses are strategically positioned over one another until the desired magnification has been achieved. Placing a 2× lens over the window with another 2× lens placed within the top exterior planar surface of the magnification housing device will result in a 4× display. By adding another 2× lens in between the first two lenses will result in an 8× display. The housing member can be split into two housing members having one or more lenses therein.

One is mounted onto the display window of the cell phone and the other is mounted to the phone case. The mounting means can be detachable or semi-permanently mounted using adhesive.

FIG. 7 is an exploded view of the present invention. Shown a housing member attached to a cellular phone by means of an elastomeric strap having a plurality of lens elements contained therein working in concert with each other to magnify the information shown in the cell phone display window. Each of the lenses is removable by peeling the upper lens from the stack of lenses.

FIG. 8 is a perspective view of the present invention. Shown is a lens housing member having a plurality of lens elements contained therein. The lens housing member is attached to an elastomeric strap member having mating hook and loop fastener material attached on each distal end. The elastomeric member provides means for selectively attaching and detaching the magnifying device to a plurality of electronic equipment, such as, cellular phones, calculators, paging devices, etc., for the purpose of magnifying the information shown in the display window. Further the elastomeric strap has one mating fastener member attached on the external side of a strap end providing means for mating the strap member and encompassed electronic equipment to another structure.

FIG. 9 is a perspective view of the present invention. Shown is a lens housing member having a plurality of lens elements contained therein attached to an elastomeric strap member having mating hook and loop fastener material attached on each distal end and encompassing a cellular telephone. The elastomeric strap has one mating fastener member attached on the external side of a strap end providing means for mating the strap member and encompassed electronic equipment to another structure, such as a dashboard. The elastomeric member provides means for selectively attaching and detaching the magnifying device to a plurality of electronic equipment, such as, cellular phones, calculators, paging devices, etc., for the purpose of magnifying the information shown in the display window.

FIG. 10 is a perspective view of the present invention. Shown is a lens housing member having a plurality of lens elements contained therein attached to an elastomeric strap member having mating hook and loop fastener material attached on each distal end and encompassing a cellular telephone, shown in outline. The elastomeric strap has one mating fastener member attached on the external side of a strap end providing means for mating the strap member and encompassed electronic equipment to another structure having the mating fastener member attached thereto.

FIG. 10 is a chart depicting the magnification which is achieved by layering the lens elements within a lens element housing member.

LIST OF REFERENCE NUMERALS

With regard to reference numerals used, the following numbering is used throughout the drawings.

10 present invention
12 cell phone
14 display window
16 lenses
18 tabs
20 housing
22 strap
24 slots
26 carrying case
28 interior
30 exterior
32 case
34 hook and loop material
36 external hook and loop material
38 dashboard
40 proximate structure
42 hook and loop material
44 clip
46 full lens display

DESCRIPTION OF THE PREFERRED EMBODIMENT(S)

In order that the invention may be more fully understood, it will now be described, by way of example, with reference to the accompanying drawings in which FIGS. 1 through 13 illustrate the present invention being a display window magnification device.

Figure 1:
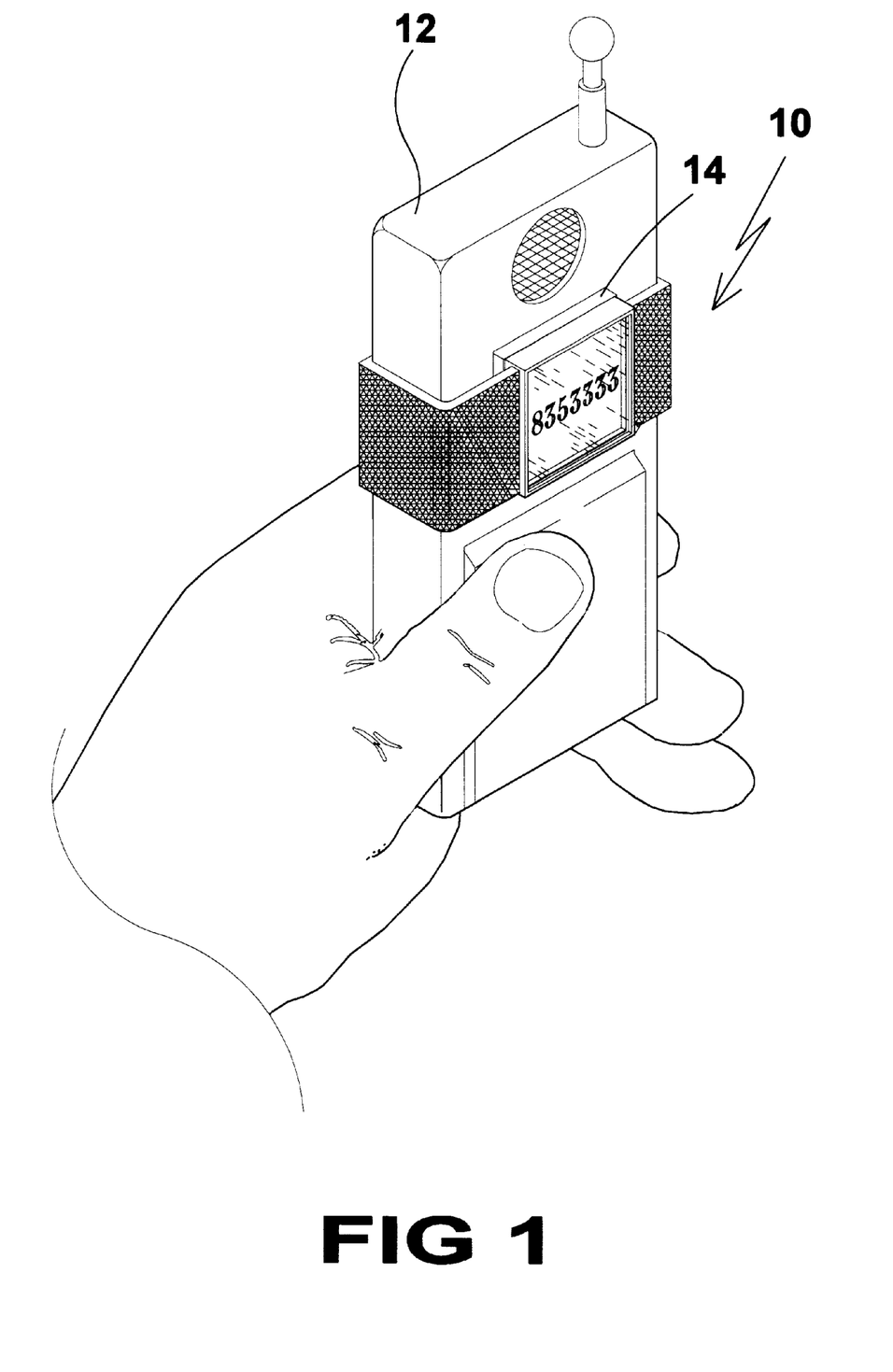
FIG. 1 is a perspective view of the present invention in use, shown is an illustrative view of a cellular phone having a display window having the magnifier strapped thereto. As more and more equipment is miniaturized the size of the display area is decreasing. This has resulted in the need for a device which can be installed either permanently or selectively to magnify the information displayed on electronic equipment having display screens.

Turning to FIG. 1, shown therein is a perspective view of the present invention 10 in use. Shown is an illustrative view of a cellular phone 12 having a display window 14 having the means for a magnifier 10 strapped thereto. As more and more equipment is miniaturized the size of the display area 14 is decreasing. This has resulted in the need for a device which can be installed either permanently or selectively to magnify the information displayed on electronic equipment having display screen.

Figure 2:
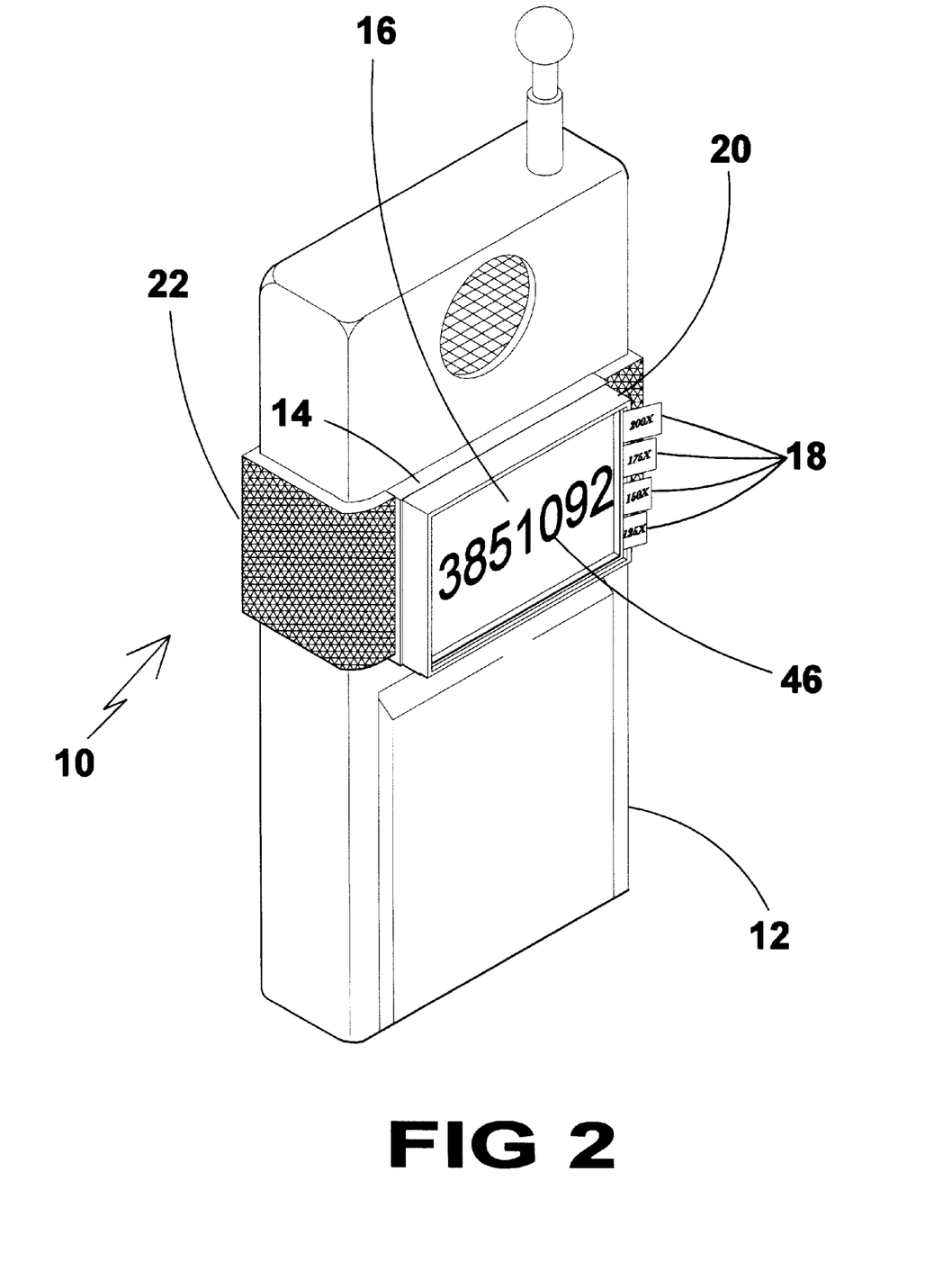
FIG. 2 is a perspective view of the present invention positioned over the display window of the cell phone as shown in FIG. 1. Whereby the user can manipulate the magnification lens by means of a plurality of stacked lenses having tabs attached to the frame of the magnification lens until the display window is enlarged to a full lens display.

Turning to FIG. 2, shown therein is a perspective view of the present invention 10 positioned over the display window 14 of the cell phone 12 as shown in FIG. 1. The user can manipulate the magnification lens by means of a plurality of stacked, peel-off lenses 16 having removable identification tabs 18 thereon, the lenses being attached to the rectangular housing means frame 20 of the magnification lens 16 until the display window is enlarged to a full lens display 46. Strap 22 provides a means for connecting the present invention 10 onto cell phone 12.

Figure 3:
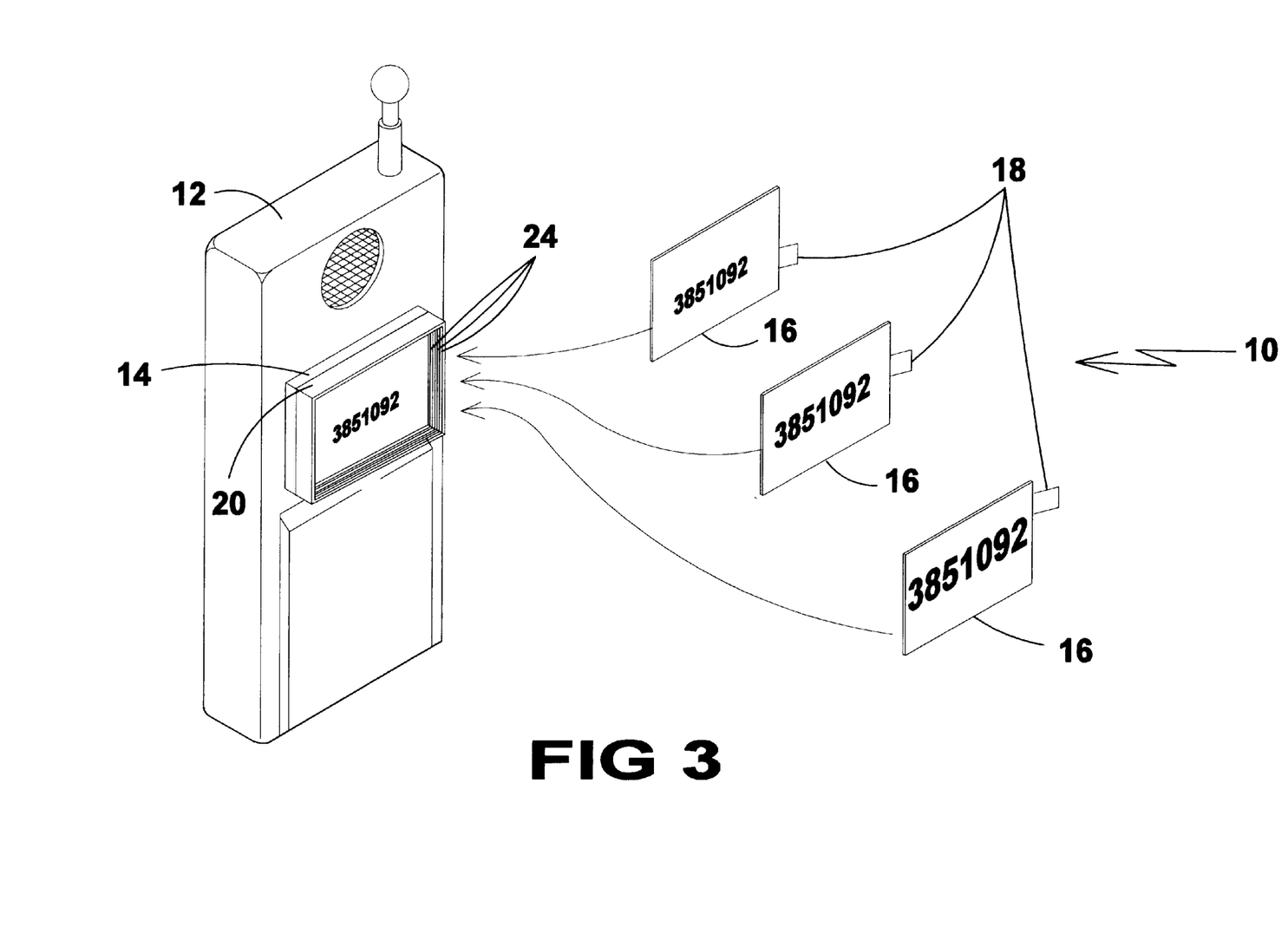

Turning to FIG. 3, shown therein is a perspective view of the present invention 10. Shown is a magnification device which can be mounted onto display windows 14 such as cellular phones 12, calculators, paging devices, GPS devices etc., whereby the contents of the display window 14 will be magnified.

The magnifying device is comprised of a housing member 20 having a plurality of lenses 16 contained therein which are relocatable by moving within adjacent slots 24 disposed within the interior surface of the frame of housing 20 whereby the distance between the lenses 16 can be altered by moving one lens to a greater or lesser distance relative to the other. Shown are three lenses 16 whereby the first lens is placed over the display window 14 and one or more lenses are strategically positioned over one another until the desired magnification has been achieved. Placing a 2× lens over the window with another 2× lens placed within the top exterior planar surface of the magnification housing device will result in a 4× display. By adding another 2× lens in between the first two lenses will result in an 8× display. The housing member 20 can be split into two housing members having one or more lenses therein. Also shown are the removable lens tabs 18.

Figure 4:
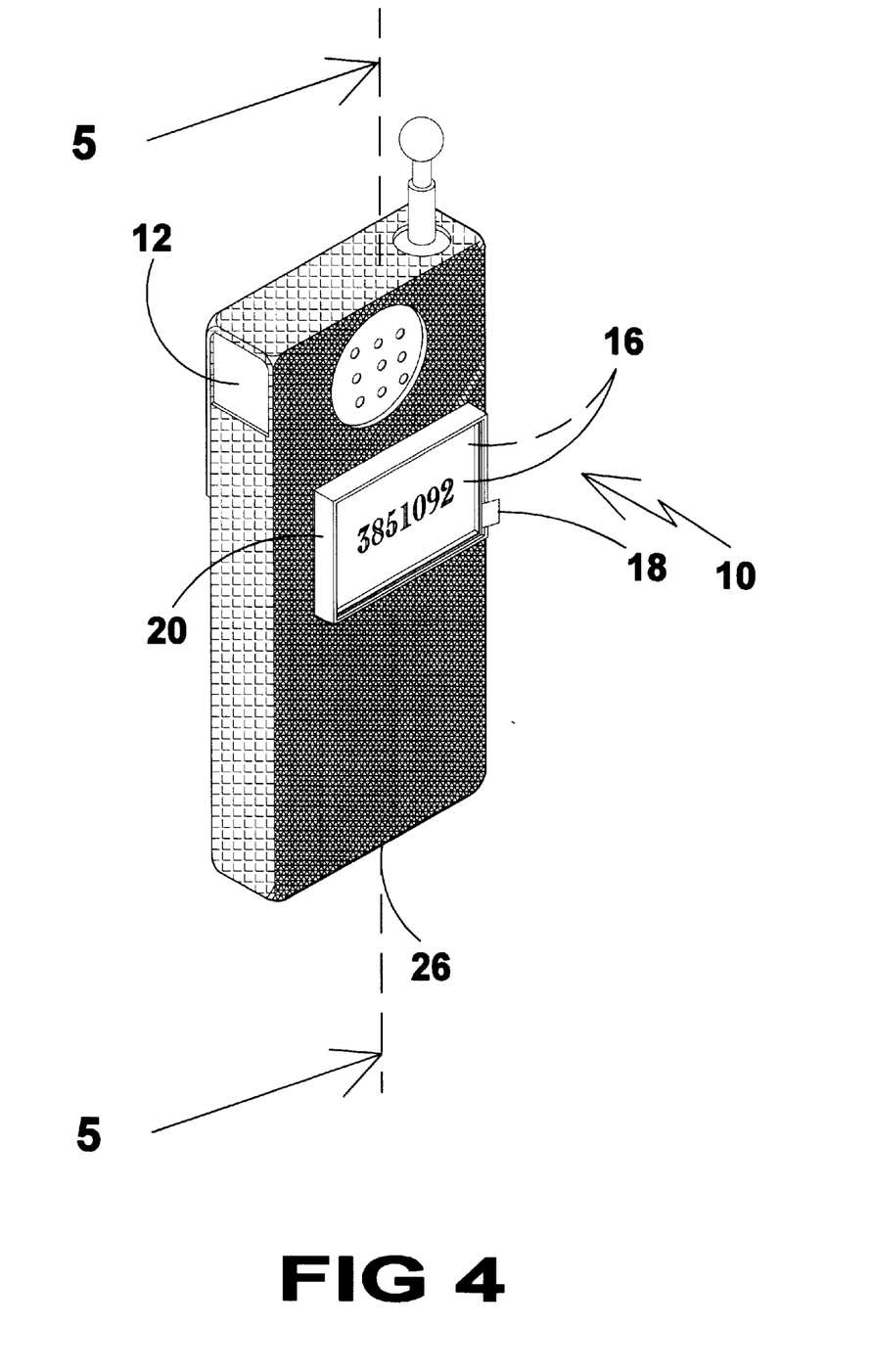
FIG. 4 is a perspective view of the present having the housing member split into two mountable magnifier members. One can be mounted onto the display window of the cell phone before inserting into the case. The other housing member can be mounted to the phone case. The mounting means can be detachable or semi-permanently mounted using adhesive.

Turning to FIG. 4, shown therein is a perspective view of the present invention 10 having the housing member 20 split into two mountable magnifier member lens 16 having tabs 18 thereon. One lens 16 can be mounted onto the display window of the cell phone 12 before inserting into the carrying case 26. The other lens member can be mounted to the phone case 26. The mounting means can be detachable or semi-permanently mounted using adhesive.

Figure 5:
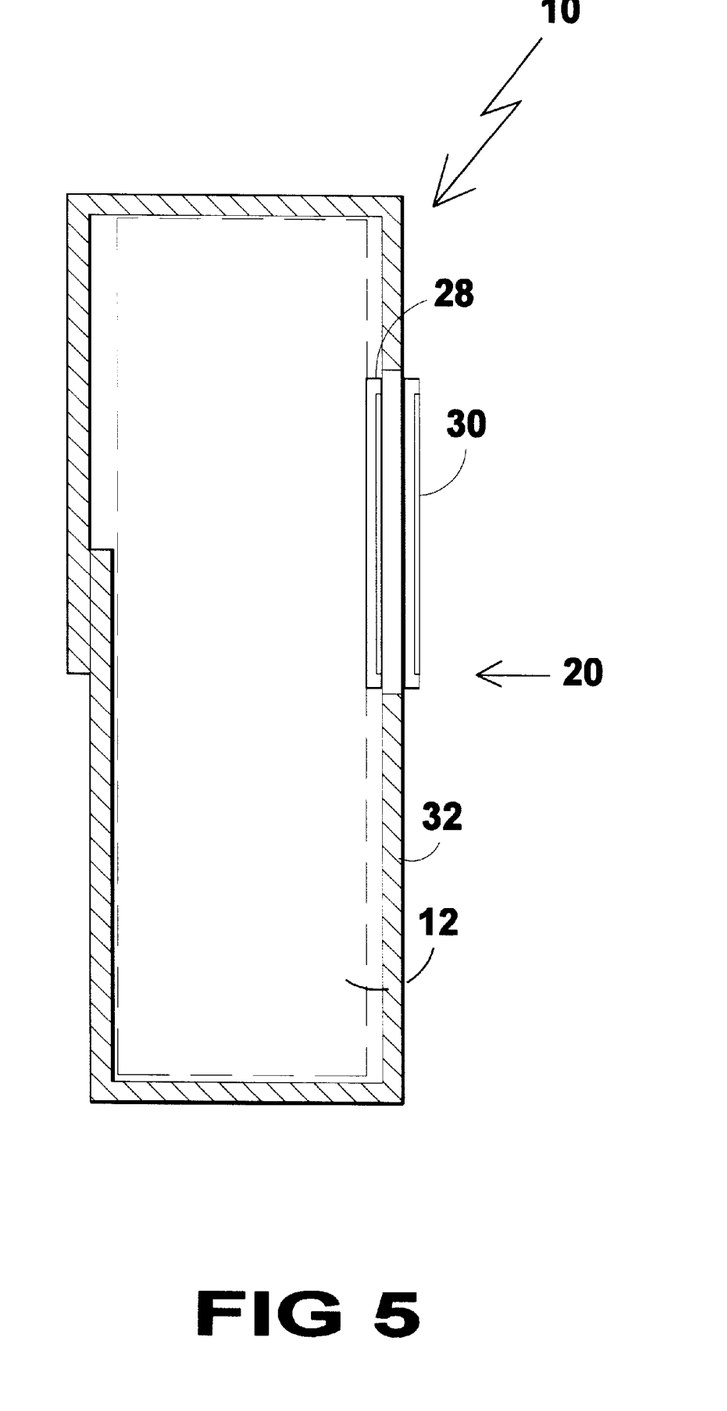
FIG. 5 is a cross sectional view of the present invention taken from FIG. 4 as indicated. Shown is a housing element which has been separated into two separately mounted members having lens elements therein.

Turning to FIG. 5, shown therein is a cross sectional view of the present invention 10 taken from FIG. 4 as indicated. Shown is a housing element 20 which has been separated into two separately mounted members having interior lens 28 and exterior lens 30 elements therein mounted on top of and adjacent each other so as to provide a line of sight through lens 28, 30.

One lens 28 is mounted onto the display window of the cell phone 12 and the other lens 30 is mounted to the phone case 32. The mounting means can be detachable or semi-permanently mounted using adhesive.

Figure 6:
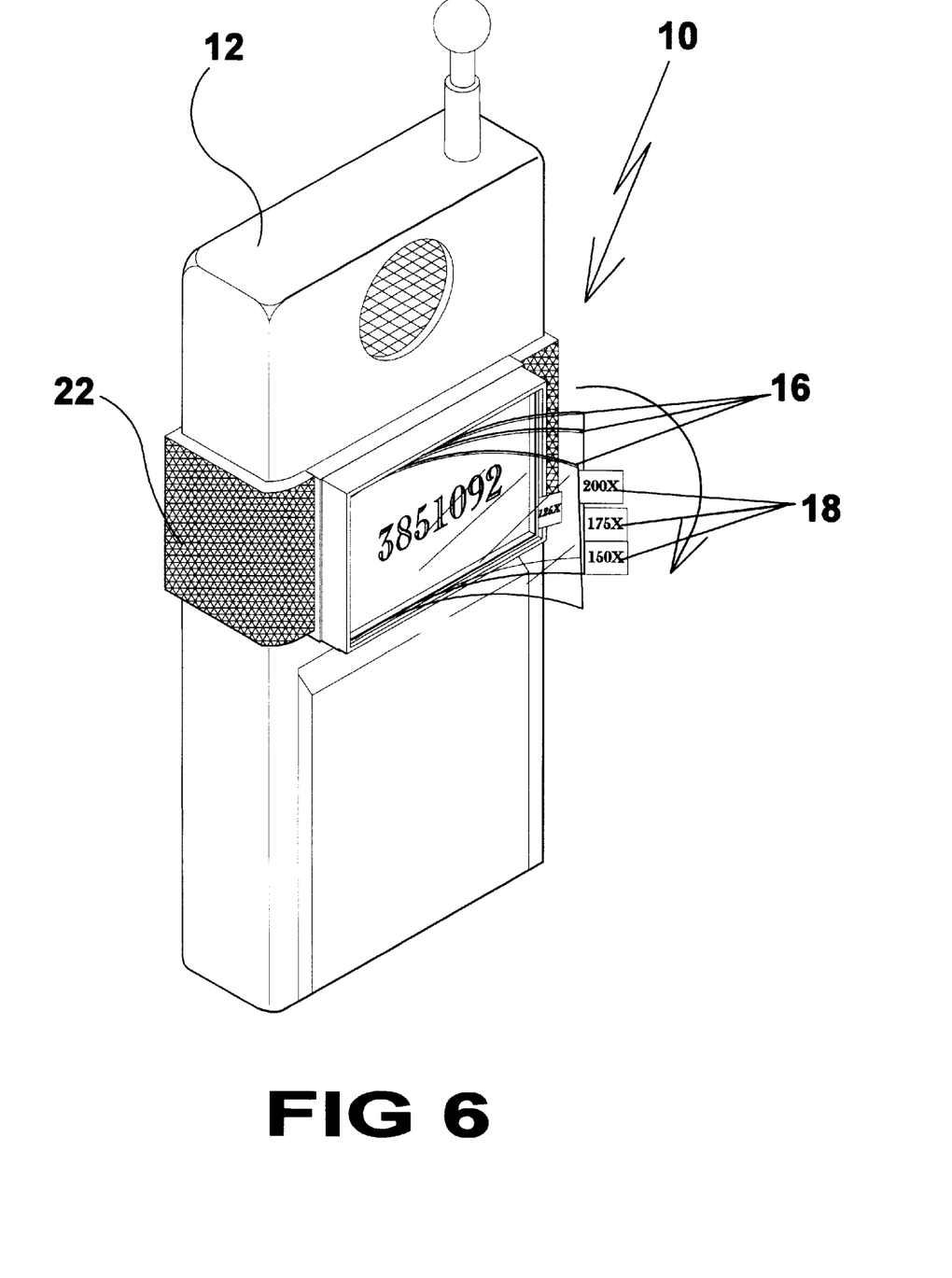
FIG. 6 is a perspective view of the cellular telephone having the magnifier attached by means of a strap member. Also shown are the peelable lenses whereby the lenses can be peeled off until the desired magnification has been achieved.

Turning to FIG. 6, shown therein is a perspective view of the cellular telephone 12 having the magnifier 10 attached by means of a strap member 22. Also shown are the peelable lenses 16 whereby the lenses can be peeled off until the desired magnification has been achieved. Tabs 18 are also shown on lens 16.

Figure 7:
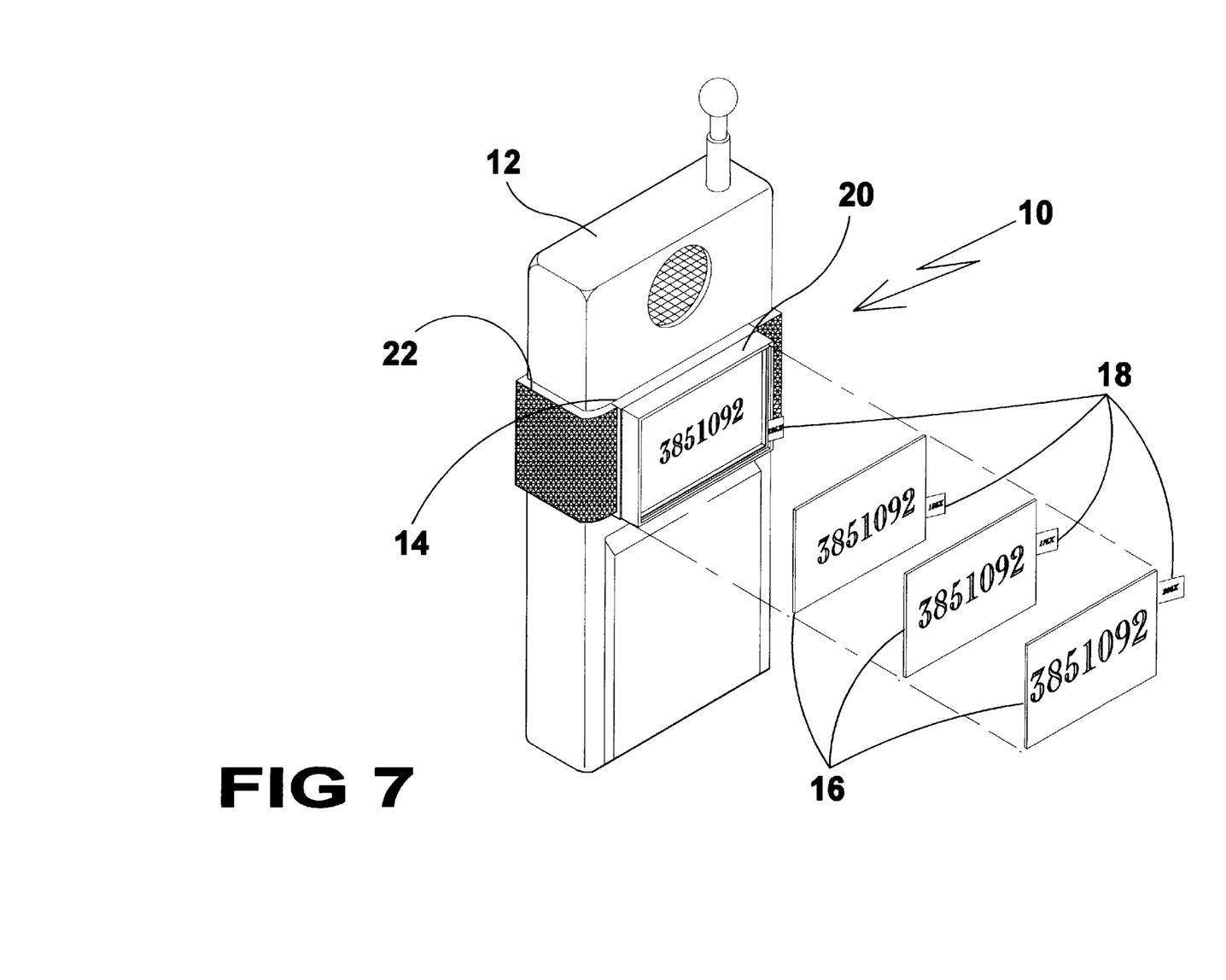

Turning to FIG. 7, shown therein is an exploded view of the present invention 10. Shown is a housing member 20 attached to a cellular phone 12 by means of an elastomeric strap 22 having a plurality of lens elements 16 contained therein working in concert with each other to magnify the information shown in the cell phone display window 14. Each of the lenses 16 is removable by peeling the upper lens from the stack of lenses. Tabs 18 are also shown.

Figure 8:
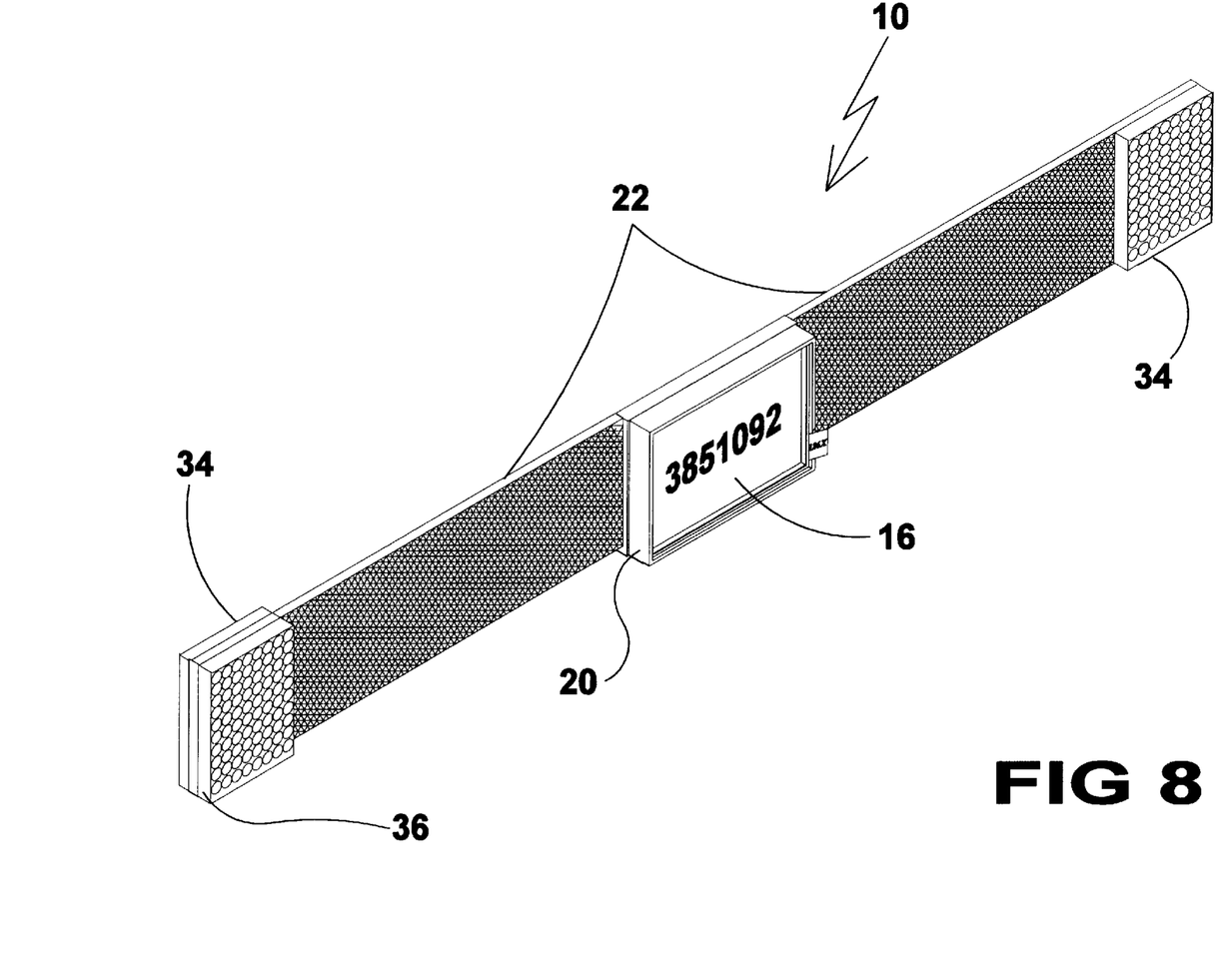

Turning to FIG. 8, shown therein is a perspective view of the present invention 10. Shown is a lens housing member 20 having a plurality of lens elements 16 contained therein. The lens housing member 20 is attached to an elastomeric strap member 22 having mating hook and loop fastener material 34 attached on each distal end. The elastomeric member 22 provides means for selectively attaching and detaching the magnifying device to a plurality of electronic equipment, such as, cellular phones, calculators, paging devices, etc., for the purpose of magnifying the information shown in the display window. Further the elastomeric strap 22 has one mating hook and loop fastener member attached on the external side 36 of a strap end providing means for mating the strap member 22 and encompassed electronic equipment to another structure.

Figure 9:
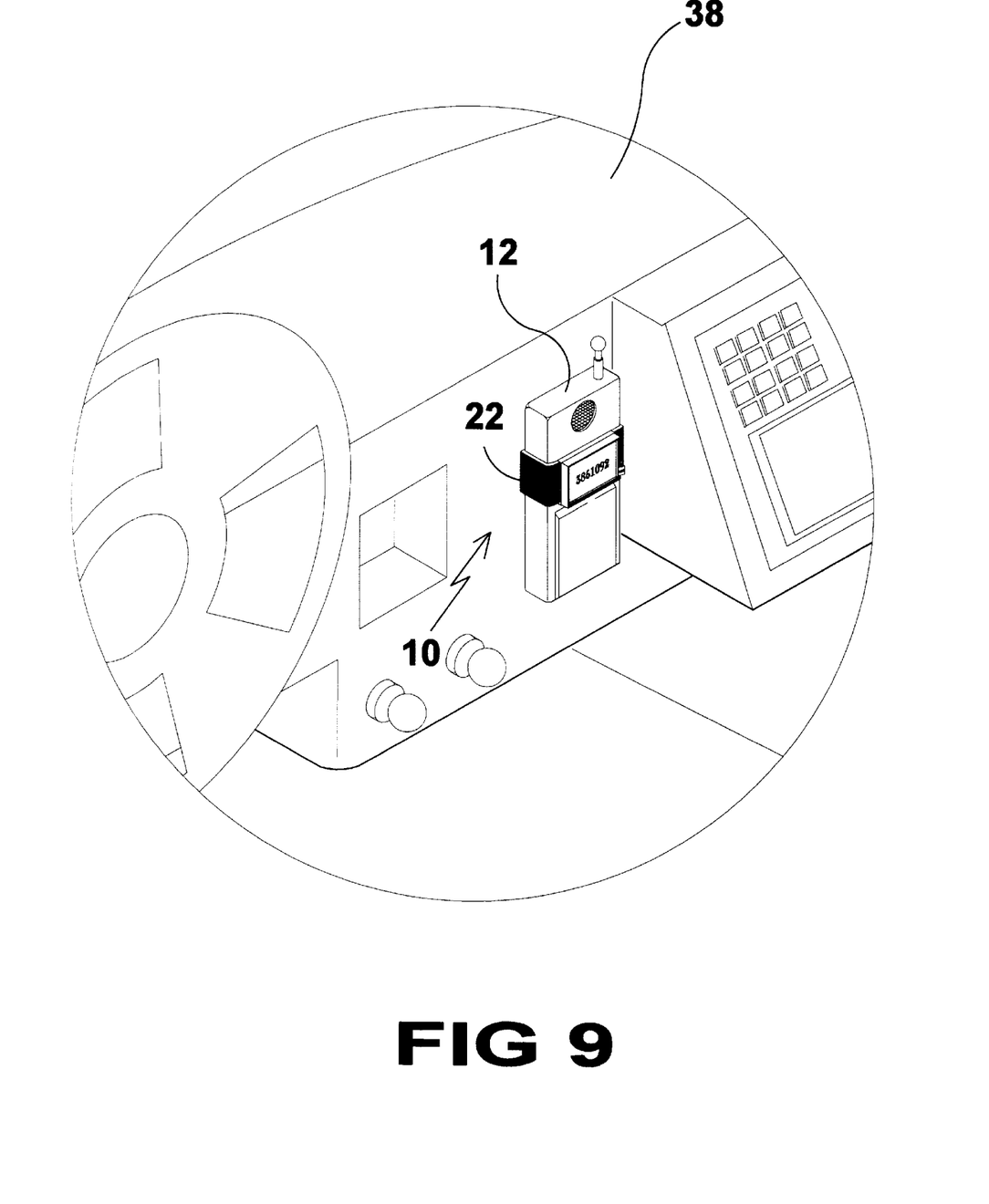

Turning to FIG. 9, shown therein is a perspective view of the present invention 10. Shown is the present invention 10 having a plurality of lens elements contained therein attached to an elastomeric strap member 22 having mating hook and loop fastener material attached on each distal end and encompassing a cellular telephone 12. The elastomeric strap 22 has one mating fastener member attached on the external side (not shown) of a strap end providing means for mating the strap member and encompassed electronic equipment to another structure, such as a dashboard 38 of an auto. The elastomeric member 22 provides means for selectively attaching and detaching the magnifying device to a plurality of electronic equipment, such as, cellular phones 12, calculators, paging devices, etc., for the purpose of magnifying the information shown in the display window.

Figure 10:
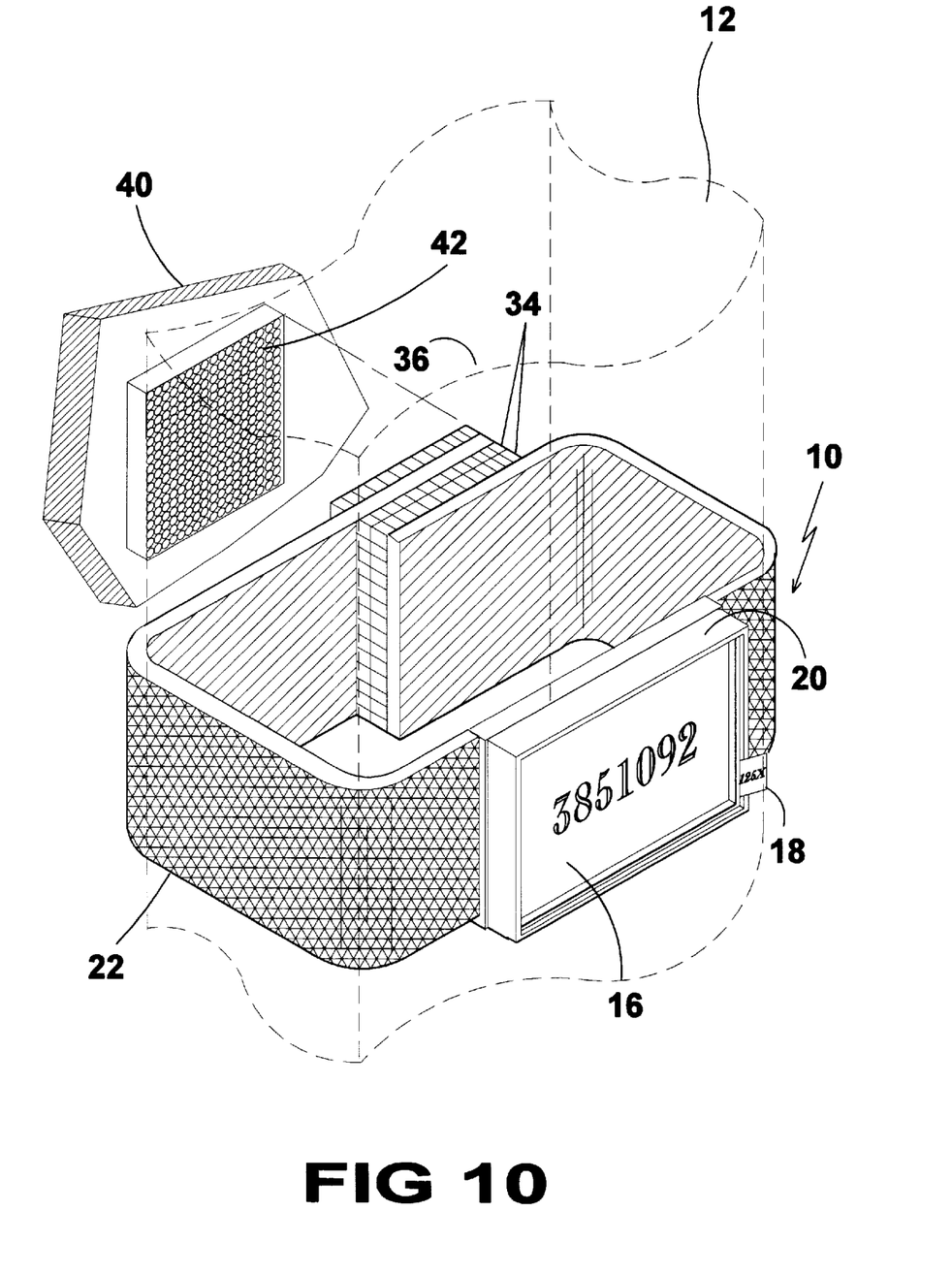

Turning to FIG. 10, shown therein is a perspective view of the present invention 10. Shown is a lens housing member 20 having a plurality of lens elements 16 contained therein attached to an elastomeric strap member 22 having mating hook and loop fastener material 34, 36 attached on each distal end and encompassing a cellular telephone 12, shown in outline. The elastomeric strap 22 has one mating fastener member 36 attached on the external side of a strap end providing means for mating the strap member 22 and encompassed electronic equipment 12 to another proximate structure 40 having a mating hook and loop fastener member 42 attached thereto. Also shown is tab 18.

Figure 11:
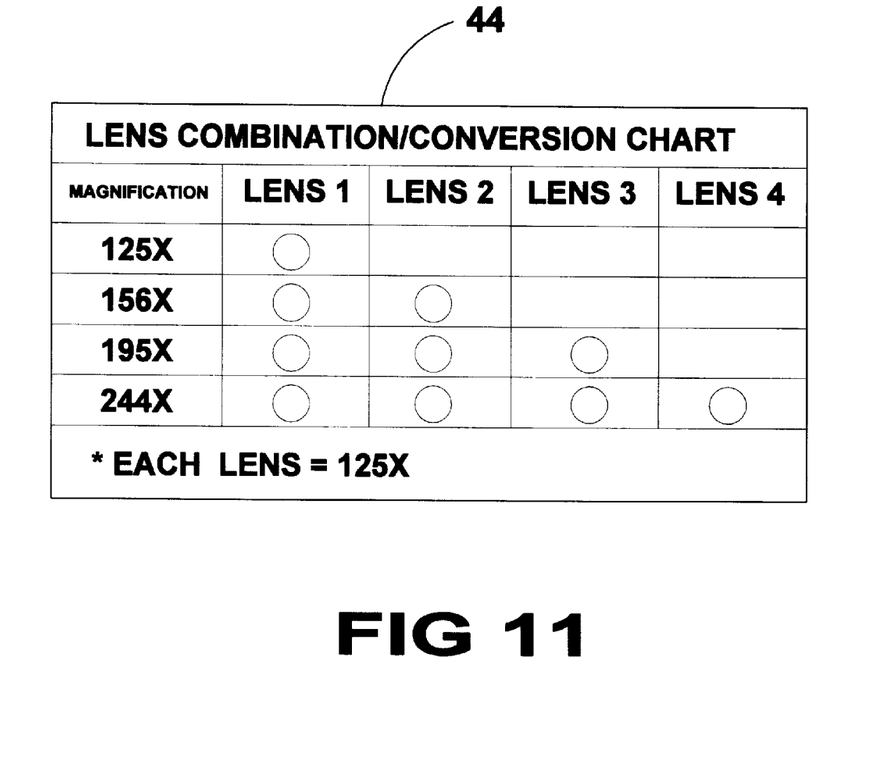

Turning to FIG. 11, shown therein is a chart 44 depicting the magnification which is achieved by layering the lens elements within a lens element housing member as disclosed by the present invention.

Figure 12:
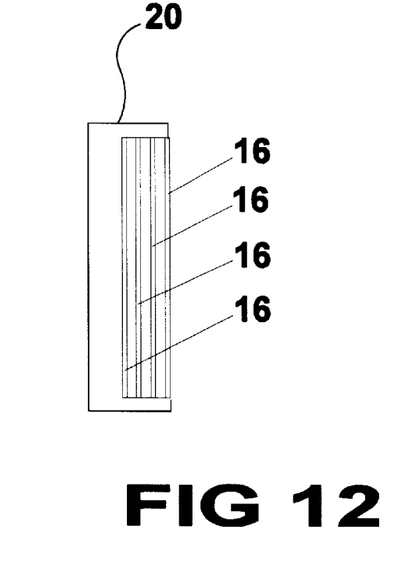
FIG. 12 is an illustrative side view of the lens element housing member having a plurality of lens elements contained therein.

Turning to FIG. 12, shown therein is an illustrative side view of the lens element housing member 20 having a plurality of lens elements 16 contained therein.

Figure 13:
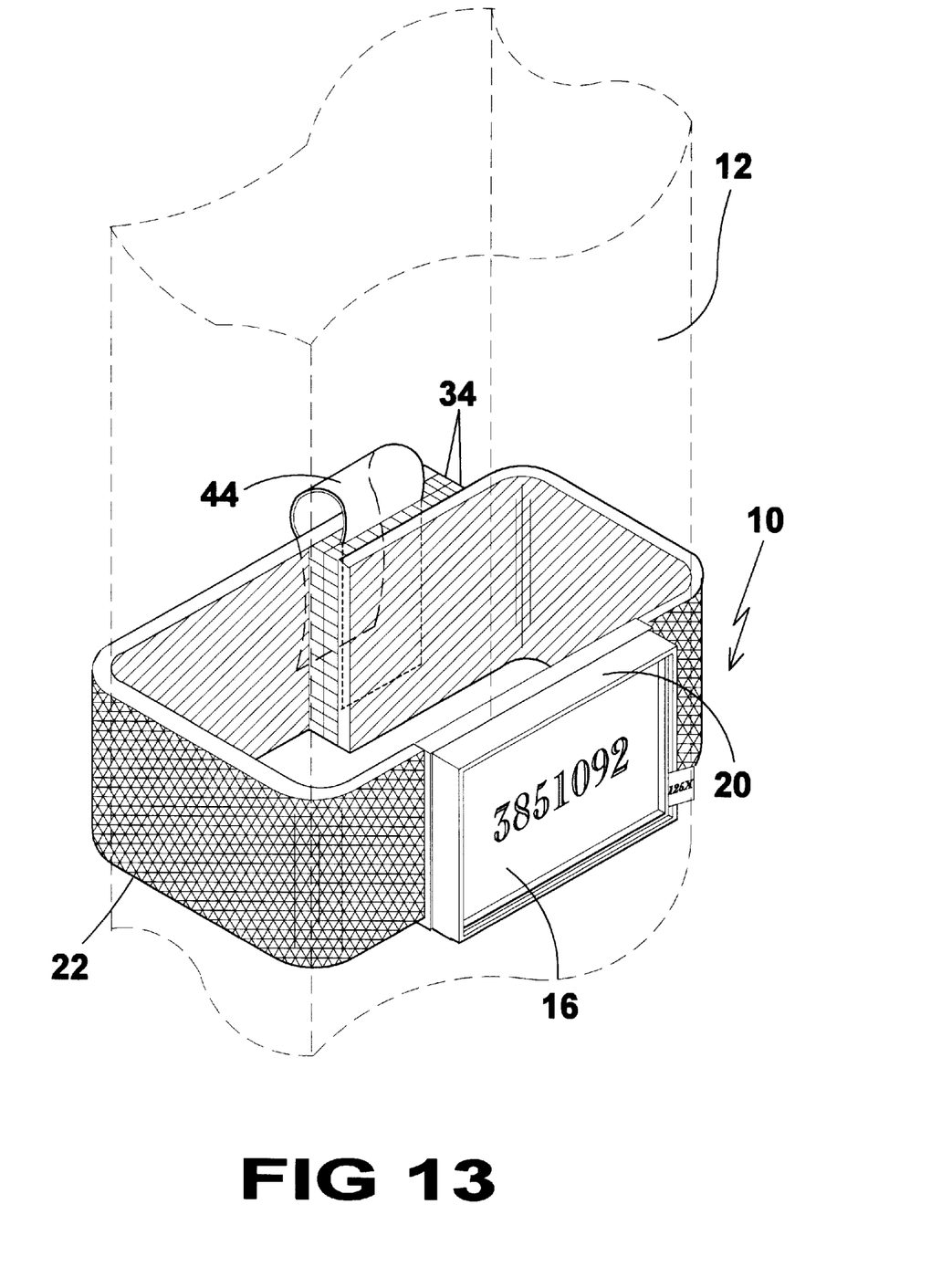
FIG. 13 is a perspective view of the present invention having an additional element in the form of a removable clip whereby the strap having a lens element incorporated therein can be clipped to an article of clothing. Also shown is a lens housing member having a plurality of lens elements contained therein attached to an elastomeric strap member having mating hook and loop fastener material attached on each distal end and encompassing a cellular telephone, shown in outline.

Turning to FIG. 13, shown therein is a perspective view of the present invention 10 having an additional element in the form of a removable spring clip 44 of the standard type whereby the strap 22 having a lens housing element 20 incorporated therein can be clipped to an article of clothing. Also shown is a lens housing member 20 having a plurality of lens elements 16 contained therein attached to an elastomeric strap member 22 having mating hook and loop fastener material 34 attached on each distal end and encompassing a cellular telephone 12, shown in outline.

I claim:

1. An apparatus for magnifying a display window of a cell phone or similar electronic device, comprising:

a) a means for magnifying comprising a plurality of lenses;
   b) a housing means for containing said means for magnifying onto said display window; and,
   c) a means for connecting said housing means to said display window.

2. The apparatus of claim 1, in which said lenses are peel-off lenses.

3. The apparatus of claim 1, said housing means further comprising a rectangular frame containing said means for magnifying.

4. The apparatus of claim 3, said frame having said lenses disposed therein, and being peel-off lenses.

5. The apparatus of claim 3, said frame defined by an interior surface and an exterior surface, said interior surface having a plurality of adjacent slots disposed therein for receiving said means for magnifying.

6. The apparatus of claim 1, said means for connecting said housing means to said display window further comprising a strap having a pair of ends thereon, said housing means disposed intermediately on said strap, one of said ends of said strap having an exposed exterior surface.

7. The apparatus of claim 6, wherein said strap is elastic.

8. The apparatus of claim 7, said strap further comprising mating hook and loop material disposed on said ends, said hook and loop material for connecting said ends to each other.

9. The apparatus of claim 8, said strap further comprising hook and loop material disposed on said exterior surface thereof, said hook and loop material for mating to a proximate object having hook and loop material thereon.

10. The apparatus of claim 6, further comprising a spring clip means disposed on said strap whereby said clip means may be connected to an article of clothing.

11. The apparatus of claim 1, further comprising an identification tab disposed on said means for magnifying.

12. The apparatus of claim 1, further comprising a case for covering the electronic device, said case having an interior surface and an exterior surface, said interior surface having a first lens disposed thereon and said exterior surface having a second lens disposed thereon.

13. The apparatus of claim 12, said first lens and said second lens disposed adjacent each other, whereby said first lens and said second lens are disposed adjacent each other providing a line of sight therethrough.

* * * * *